March 2, 1926.                                                        1,575,078
J. H. PIPER
OIL COLLECTOR AND DISTRIBUTOR
Filed June 25, 1923
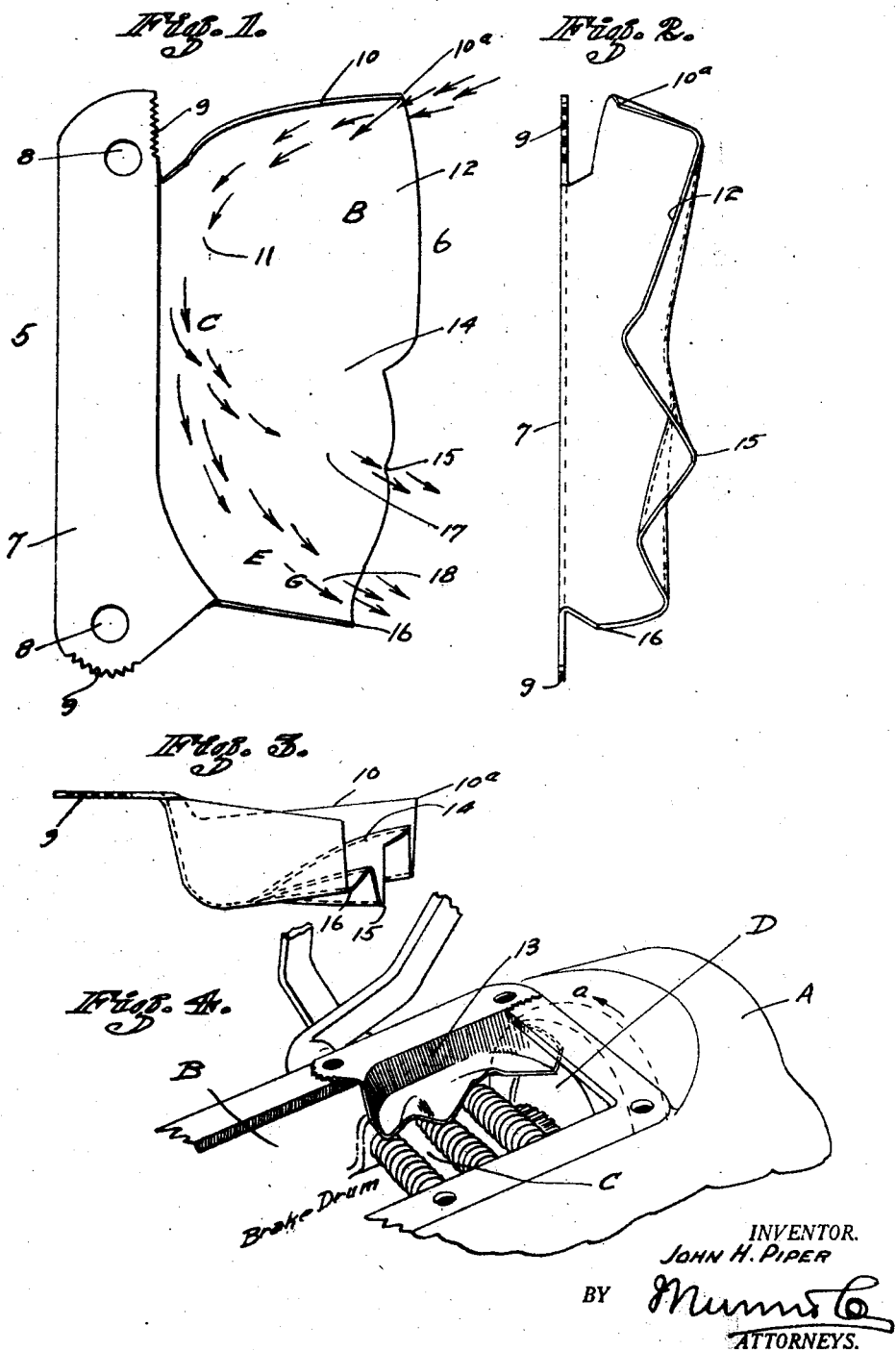
INVENTOR.
JOHN H. PIPER
BY
ATTORNEYS.

Patented Mar. 2, 1926.

1,575,078

UNITED STATES PATENT OFFICE.

JOHN H. PIPER, OF PALO ALTO, CALIFORNIA.

OIL COLLECTOR AND DISTRIBUTOR.

Application filed June 25, 1923. Serial No. 647,584.

*To all whom it may concern:*

Be it known that I, JOHN H. PIPER, a citizen of the United States, and a resident of Palo Alto, county of Santa Clara, State of California, have invented a new and useful Oil Collector and Distributor, of which the following is a specification.

This invention relates to lubricating devices generally and particularly to devices for use in connection with the engines of automobiles.

The invention is designed especially for use in connection with what are generally known as Ford automobiles. Heretofore, it has been difficult under certain conditions and due to well known lubricating systems to supply the proper quantities of lubricant to the transmission mechanism of the engine. This is particularly true when the automobile is traveling down grade. At such time there exists a tendency of the oil in the transmission case to seek its lowest level and in consequence thereof, the respective drums and adjuncts of the transmission mechanism are not emersed in the oil and soon become so dry that over heating of these parts occur. This shortens the life of the transmission mechanism and in critical instances renders same inoperative and frequently results in total destruction of the parts thereof.

My invention has for its primary object the provision of a simple and novel attachment which can be quickely applied to well known automobile equipment and associated with the fly wheel and respective parts of the transmission mechanism so that when the automobile is traveling down grade, the fly wheel acts in conjunction with my attachment to cause quantities of oil to be gathered from the wheel and conveyed to a collector or tray and distributed automatically from the latter to the respective instrumentalities of the transmission mechanism, thereby permitting said instrumentalities to always work in a proper bath of oil and to be maintained in a cool condition.

A still further object of the invention is to provide an attachment of this character which can be applied to the transmission case without requiring any alterations in the construction thereof.

A still further object of the invention is to provide an attachment of this character which can be associated with the gasket of the transmission case cover so that the joints between the device and the walls of the case will be positively sealed against the escape of oil therefrom.

While I have shown only the preferred form of my invention I wish it to be understood that various changes and modifications may be made within the scope of the claims hereto attached without departing from the spirit of the invention.

In the drawings:

Figure 1 is a plan view of the attachment.

Figure 2 is an edge view thereof. Figure 3 is an end view thereof and

Figure 4 is a prospective view of a portion of a transmission case showing the attachment applied thereto, the cover of the case being removed for the purpose of clearness.

The transmission case A is of the type employed generally in what are known commercially as Ford automobiles. As illustrated the case is open at B and said opening may be covered in the usual manner by a plate, not shown. The working instrumentalities C of the transmission mechanism are located in the case A at a point below the aforesaid opening B. Associated with the transmission case is the fly wheel D of the engine. The parts above referred to are of the usual well known construction and are adapted to be ordinarily lubricated by a splash system or by emersion of the mechanism in a bath of oil contained in the transmission case. When the automobile is traveling down grade the transmission case A is canted to the extent that the oil in the case flows to its lowest level and becomes separated or out of contact with the instrumentalities of the transmission mechanism, and in consequence thereof the said instrumentalities soon become overheated and are frequently seriously burned by the action of friction.

My invention is designed to co-act with the aforesaid instrumentalities of the transmission mechanism and same functions to safeguard against accidental overheating of the parts due to lack of proper lubrication. It comprises a tray or collector (5) which includes a receptacle-like body (6) and an angular attaching flange (7), the latter having perforations (8) therein adapted to coincide with perforations in the adjacent walls of the case A and to be firmly bolted between said walls and the customary closure plate of said case. The said flange (7) is provided at its ends with serrations (9) which act to cause the sealing gasket of the closure plate to become firmly embedded in said serrations and thereby seal the joints between the ends of the flange and the gasket and positively prevent leakage at these points.

The body (6) is formed with an angular wall (10) which is substantially disposed vertically and arranged with respect to one side of the flywheel D so that oil as it flows downward from the top of the wheel will be collected by said wall (10) and conveyed to the gutter (11) defined by the walls of the body (6) as clearly shown in Figures 1 and 4 of the drawings.

The body (6) has its wall (12) disposed substantially at an acute angle to the plane of the wall (13) of said body (6). In other words, said wall (12) is tilted at a downward angle where it merges directly into said gutter (11).

The gutter (11) is of arcuate configuration and opens onto the respective ends of said body (6). Said body (6) is formed with ridges (13), (14), (15) and (16) which define troughs (17) and (18); whose inner ends communicate with said gutter (11). These ridges (15) and (16) are respectively disposed at different angles to the body (6) so that oil is permitted to flow more freely from the trough (18) than from the mating trough (17). In this manner oil in proper quantity is permitted to constantly circulate through the brake drum of the transmission mechanism so that the lining of the drum is always thoroughly lubricated.

The upper part of the body (6) is open normally but when applied to the case A is closed by the cover of said case. This permits any oil that may have been collected on the underside of the cover to gravitate into the gutter (11) of said body (6) and it acts in conjunction with the wall (10) to keep the body (6) constantly supplied with oil. Generally the opening B of the crank case A extends at a downward angle from the top of the case. When the attachment (5) is applied as shown in Figure 4 it assumes a corresponding angle to that of the opening B and incident thereto, the gutter (11) is so inclined that oil gravitates therefrom and flows from the troughs (17) and (18) as previously referred to herein.

The device provides means which operates automatically to cause oil to be operatively collected from the transmission case and to constantly cycle through the respective drums and adjuncts of the transmission mechanism so that these parts under practically all conditions are always maintained in a perfect state of lubrication.

In practice, the flange (10) is spaced for a distance of approximately one-eighth of an inch from the adjacent flat face of the fly-wheel of the engine. Assuming that the fly-wheel is revolving in the direction of the arrow a in Figure 1 it follows that the oil from the wheel is caught by the edge 10ª of said flange (10) where it is brought with considerable force into the gutter (11). Incident to the arcuate formation of said gutter (11) it is obviously seen that the oil is carried with consistant force through said gutter and that it is discharged with corresponding force onto the parts of the transmission mechanism to be lubricated. In other words, the said edge 10ª of the flange acts in conjunction with the flywheel of the engine and the gutter (11) to cause the oil to be twirled from the tray and effectively thrown onto said parts to be lubricated, the constant forced circulation of oil around the parts serving to keep said parts in a cool working condition at all times.

I claim:

1. An oil collector having an oblong upright intermediate member, the opposite end portions of which are disposed in substantially parallel relation one to the other, said collector also having a securing flange connected to the edge portion of the intermediate member between the substantially parallel portions thereof, and a pan portion connected to the entire lower edge of the said intermediate member and contructed so as to provide a series of transverse ducts opening through one side of the pan portion.

2. An oil collector having an oblong upright intermediate member, the opposite end portions of which are disposed in angular relation to the intervening portion and one of these being curved and flared, said collector also having a securing flange connected to the upright member between said end portions thereof and an oblong pan portion having three of its lateral edges connected to the entire lower edge of the upright intermediate member and formed with a series of transverse ducts opening through the free side of the pan member and disposed in different parallel planes and sloping inwardly with respect to the free edge of the pan portion, said securing flange and pan portion being arranged in substantially parallel planes and extending in opposite directions from the intermediate member.

JOHN H. PIPER.